United States Patent [19]

Bruynseels et al.

[11] Patent Number: 5,859,097
[45] Date of Patent: Jan. 12, 1999

[54] EPOXY RESIN COMPOSITIONS CONTAINING RED PHOSPHORUS

[75] Inventors: Maria Julia Jozef Bruynseels; Malte Homann, both of Louvain-La-Neuve, Belgium

[73] Assignee: Shell Oil Company, Houston, Tex.

[21] Appl. No.: 937,643

[22] Filed: Sep. 24, 1997

Related U.S. Application Data

[63] Continuation of Ser. No. 680,257, Jul. 11, 1996, abandoned.

[51] Int. Cl.$^6$ ..................................................... C08L 63/00
[52] U.S. Cl. .......................... 523/427; 523/428; 523/429; 523/451; 428/413
[58] Field of Search ..................................... 523/427, 428, 523/429, 451; 428/413

[56] References Cited

U.S. PATENT DOCUMENTS

| | | | |
|---|---|---|---|
| 2,857,362 | 10/1958 | Shepherd, Jr. et al. | 260/47 |
| 2,915,490 | 12/1959 | Hopper | 260/37 |
| 3,477,982 | 11/1969 | Dijkstra et al. | 260/37 |
| 5,317,067 | 5/1994 | Yagi et al. | 525/438 |

FOREIGN PATENT DOCUMENTS

| | | | |
|---|---|---|---|
| 0428863 A2 | 5/1991 | European Pat. Off. | C08G 59/50 |
| 58109553 | 12/1981 | Japan | C08K 6/32 |
| 93053810 | 1/1985 | Japan. | |
| 02129234 | 11/1988 | Japan | C08J 5/24 |

OTHER PUBLICATIONS

Chemical Abstracts 125:88772, "Fireproofed Epoxy Resin Compositions", Saito et al., Apr. 1996.

*Primary Examiner*—Frederick Krass
*Attorney, Agent, or Firm*—Dennis Carmen

[57] ABSTRACT

Curable epoxy resin composition comprising a bisphenol based epoxy resin having between 1.1 and 2.5 epoxy groups on average per molecule, a polyhydric phenol curing agent having more than two phenolic hydroxyl groups on average per molecule and red phosphorus. Also are described a process for the production of such curable epoxy resin compositions, the use of the compositions, especially in the impregnation of fibrous fibers, and products comprising or coated by the partly cured or cured epoxy resin compositions, especially impregnated fibrous fibers and laminates made therefrom.

22 Claims, No Drawings

EPOXY RESIN COMPOSITIONS CONTAINING RED PHOSPHORUS

This is a continuation of application Ser. No. 08/680,257, filed Jul. 11, 1996, now abandoned.

FIELD OF THE INVENTION

The present invention relates to curable epoxy resin compositions.

BACKGROUND OF THE INVENTION

There is a continuing interest in the industry for self-extinguishing and non-burning resinous materials, for example, for surface coatings, castings, moulded articles, and in particular for laminates for use in electrical equipment. The excellent physical, chemical and electrical properties of cured polyepoxides make these compounds extremely suitable for the above applications. However, the usual polyepoxides are, as most organic materials, flammable. Therefore, many attempts have been made to improve the flame retardancy of this class of resins. One of the most widely investigated fields of research to improve the flame retardancy has been the incorporation of chlorine or bromine containing resin compounds as halogenated polyepoxide compounds or halogenated curing compounds. Further, also the use of chlorine and bromine containing additives has been widely studied. Nowadays, however, from an environmental point of view the use of halogenated compounds is less desired. Thus, there is an active interest to look for non-halogenated fire retardants.

The use of red phosphorus in a process for imparting flame proofing properties to polyepoxides is known from U.S. Pat. No. 3,477,982. It has been described in this document that resin compositions having a good flame retardancy can be obtained by mixing especially glycidyl polyethers of polyhydric phenols and polycarboxylic anhydrides or amino compounds having at least two amino hydrogen atoms per molecule with finely divided red phosphorus. Preferably 6 to 25 parts by weight of finely divided red phosphorus per 100 parts by weight of polyepoxide is used (column 1, line 70). From Table IX it is indeed clear that, in order to obtain good extinction times at least 6 weight percent of phosphorus is necessary. Further, in the other examples usually 8 to 11 percent by weight on resin composition is used. The compositions described in this document, either as such or in combination with a solvent, may be used for the impregnation of glass fiber materials for the preparation of prepregs, which can be used for making laminates.

In European patent application 428,863, it has been described that in view of the high amounts of red phosphorus necessary to reach the required flame retardancy (more than 15 percent based on resin) it is hardly possible to reach the requirements with respect to the E-corrosion resistance (page 4, lines 32 ff.). It is further indicated that the combination of red phosphorus and metal oxides, carbonates or hydroxides not results in epoxy resin systems having the UL 94V required V-0 flame resistance. In Example 6 epoxy resins are prepared from an epoxidized novolac in combination with a novolac curing agent. The results of the flame retardancy properties of the resins made are shown in Table 6. It appears that acceptable results are only obtained when using large amounts of red phosphorus (15 percent, Example 12) or by using the combination of red phosphorus and alumina (7.5 percent each, Examples 13 and 14). It is desirable to solve the problem of the high amounts of red phosphorus to obtain the required flame resistancy.

SUMMARY OF THE INVENTION

A curable epoxy resin composition is provided comprising: (a) a bisphenol-based epoxy resin having between 1.1 and 2.5 epoxy groups on average per molecule, (b) a polyhydric phenol curing agent having more than two phenolic hydroxyl groups on average per molecule and (c) red phosphorus. Such composition is particularly suitable for use in a solventless prepregging process.

DETAILED DESCRIPTION OF THE INVENTION

It has been found that the use of very specific amine curing agents, in combination with an aromatic and/or heterocyclic polyepoxy resin. This specific combination shows the required flame resistancy when an amount of up to 5 percent red phosphorus is used.

It has been found that epoxy resins having good flame retardancy properties when comprising only relatively low amounts of red phosphorus can be obtained by using the combination of a bisphenol based epoxy resin having between 1.1 and 2.5 epoxy groups on average per molecule and a polyhydric phenol curing agent having more than two phenolic hydroxyl groups on average per molecule. Cured resins having a V-0 classification according to the UL 94V are obtained when using amounts of for instance between 2 and 5 percent red phosphorus. A very suitable epoxy resin is the diglycidyl ether of bisphenol A, while a very suitable curing agent is a novolac resin having on average between three and four phenolic hydroxyl groups. The cured products further show an excellent heat resistance, especially in comparison with resins made from brominated resins or curing agents.

Thus, the present invention relates to curable epoxy resin compositions comprising a bisphenol based epoxy resin having between 1.1 and 2.5 epoxy groups on average per molecule, a polyhydric phenol curing agent having more than two phenolic hydroxyl groups on average per molecule and red phosphorus. Suitably, the epoxy resin has between 1.5 and 2.2 epoxy groups on average per molecule, more suitably between 1.8 and 2.1 epoxy groups on average per molecule. Preferably the epoxy resin is the reaction product of a bisphenol and an epihalohydrin. This reaction is usually carried out in the presence of an alkali hydroxide. Molecular weight, epoxy equivalent, softening point and viscosity of the polyepoxide depend in general on the ratio of epichlorohydrin to polyhydric phenol. Illustrative examples of these reactions and the epoxy compounds thus obtained are described in for instance The Handbook of Epoxy Resins by H. Lee and K. Neville, McGraw-Hill, New York (1967), Epoxy Resins, Chemistry and Technology, edited by C. A. May, Marcel Dekker (1988) and Chemistry and Technology of Epoxy Resins, edited by B. Ellis, Blackie Academic & Professional (1993).

A group of preferred epoxy resin to be used in the curable composition of the present invention has the general formula (I)

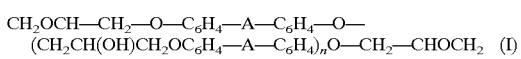

in which A is a divalent hydrocarbon group having 1 to 8 carbon atoms, —C(O)—, —O—, —S—, —S—S—, —S(O)—, —S(O)$_2$— or a covalent bond, and n has an average value of 0 to 12. Optionally one or more, especially two or four, methyl groups may be present as substituents of the two phenyl groups in the molecule. More preferably A is methylene or isopropylene and n has an average value from 0 to 2, still more preferably A is isopropylene and n is up to 0.2. These more preferred glycidyl polyethers are usually viscous liquids or semi-solids at 25° C. The viscosity of such glycidyl polyethers may be decreased by mixing with a minor portion, i.e. from 5 to 20 percent by weight of a liquid monoepoxide such as butyl glycidyl ether, phenyl glycidyl ether, stearyl glycidyl ether, or a glycidyl ester of a monocarboxlic acid, such as aliphatic monocarboxylic acids having 9 to 11 carbon atoms per molecule.

The average epoxy equivalent weight is from 140, preferably from 170, up to about 3000, preferably up to 950, more preferably up to about 450.

Especially preferred examples of the epoxy compounds are bisphenol A and bisphenol F, especially bisphenol A, type epoxy compounds having an average epoxy equivalent weight of from 160 to 200. They are commercially available from Shell Chemicals Company under the trade names EPON® Resins 828, 862 and 806.

Suitably, the polyhydric phenol curing agent to be used in the curable composition of the present invention has between 2.5 and 6 phenolic hydroxyl groups on average per molecule especially between 3.5 and 5 phenolic hydroxyl groups on average per molecule. Very suitably, the polyhydric phenol curing agent is a condensation product of a phenol compound and an aldehyde. Preferably, such a phenol compound is phenol, cresol, bisphenol A, bisphenol F, hydroquinone, resorcinol, methyl resorcinol, tetramethylbiphenol, biphenol, naphthol, dihydroxynaphthalene, more preferably phenol, cresol or bisphenol A. Preferred aldehydes are formaldehyde, acetaldehyde, propionaldehyde and hydroxybenzaldehyde. Especially preferred is the combination of phenol or bisphenol A as the phenol compound and formaldehyde as the aldehyde compound. The condensation of the phenol compound and the aldehyde is usually carried out at temperatures between 40° and 100° C. for periods between 4 and 12 hours under acidic conditions. The preferred phenolic novolac resin curing agents are bisphenol-A novolacs having a weight per phenolic group (WPP) of from 60 to 500, preferably of from 80 to 300. Such phenolic novolacs are commercially available. The phenolic novolac curing agent will be present in the composition in an amount effective to cure the epoxy resin. The ratio between the equivalents of epoxy groups and hydroxyl groups is suitably between 0.25 and 4.0, preferably between 0.5 and 2.0, more preferably about 1. In terms of weight percents, the curing agent will be present in an amount generally from 10 to 70 weight percent, preferably of from 15 to 40, based on the combined weight of epoxy resin and curing agent.

In order to promote faster and/or lower temperature cure of the resin components of the composition, an optional cure accelerator may be used. Many suitable accelerators, such as urea's, tertiary amines, imidazoles, phosphenes, octoates, and boron trifluorides, for example are known in the literature. In this respect reference is also made to the three general references mentioned above. The presently preferred accelerator are the imidazoles, for example 1-methyl imidazole, 2-ethyl imidazole, 2-methyl-4-ethyl imidazole and isopropyl imidazole and tertiary amines. Because of its availability and performance characteristics, 2-methyl imidazole is the preferred accelerator. The accelerator will be present in the composition in an amount effective to increase the cure rate and/or lower the cure temperature of the composition, generally in an amount from 0.001 to 5, preferably from 0.01 to 1 weight percent, based on the weight of the composition.

The compositions may also comprise one or more additives, for instance a solvent or diluent, a filler, pigments, dyes, flow modifiers, thickeners, reinforcing agents, fire retarding or surpressing agents or combinations thereof. A particular useful additive is finely divided silica, such as commercially available under the trade names Aerosil and Cab-O-sil, which can be used in amounts of from 1 to 5 parts per weight per 100 parts by weight of polyepoxide to assist in keeping the finely divided red phosphorus suspended.

The amount of red phosphorus to be used in the compositions according to the present invention is suitably up to 12 percent by weight based on the total resin composition, more suitably up to 10 percent, preferably between 0.5 and 7.5 percent, more preferably between 1.0 and 5.0 percent. The phosphorus is preferably used in the form of finely divided phosphorus, especially in a stabilised form. An effective stabiliser is magnesium oxide, which can, for example, be precipitated onto the red phosphorus. In another application the phosphorus is stabilised by a resin (e.g epoxy resin or phenolformaldehyde resin). The latter composition is commercially available under the trade name MASTERET 70450. Such a grade may have an average particle size of about 11 microns, or 20 microns.

The temperature and the reaction time for the cure of the curable compositions according to the present invention depends on the choice of the polyepoxide and the curing component and the presence of an accelerator. The cure can be carried out in one or more stages, depending on the curing components and the envisaged application. Usual curing temperatures are between 60° and 210° C., preferably 100°–180° C., and curing times are between 1 minute and 12 hours.

The compositions of the invention can be used for making flame retardant, self-extinguishing or non-burning resinous articles by casting or moulding and allowing to cure. They can also be used for coating a surface, e.g. the surface of a porous fibre laminate, a casting or moulded article with a self-extinguishing or non-burning surface coating. They are preferably used for making fiber reinforced articles by impregnating fibre strands, mat or cloth and allowing to cure. Compositions containing finely dispersed red phosphorus in which the mixture of polyepoxide and curing agent is liquid, usually after heating or dissolving, may be applied to the fiber material by dipping, spraying, impregnation or brushing and allowing to cure partly or completely directly after the mass has been brought into the desired shape. In cases where a latent curing agent is used, that is a curing agent which provides full cure only at elevated temperature, the resin composition in the fibrous material may be cured partially. Such a partially cured resin is called a B-stage resin and may be used for the preparation of laminates. The resin is still soluble in solvents and fusible. Such a fibrous material may be stored for some time before the eventual laminate is made by curing at elevated temperatures. The fiber material may also be impregnated with a composition according to the present invention in combination with a volatile solvent, whereupon the solvent is evaporated. The resin components may then be allowed to cure partially. Impregnated fiber materials prepared by this method may also be stored for some time, before laminates are prepared from them. Suitable solvents are ketones, such as acetone, and aromatic solvents such as toluene. For the preparation of prepregs from the compositions of the present invention preferably the process and apparatus as described in U.S. Pat. No. 5,492,722, which is hereby incorporated by reference, (solventless process) is used, or the processes or apparatuses as described in International patent applications PCT/EP 94/04326, PCT/EP 94/04327 and PCT/EP 94/04328. The prepregs thus obtained may be used for the preparation of laminates.

The present invention further relates to a process for the preparation of the curable compositions as described above by mixing the constituents. This is usually done at temperatures between 0° C. and 50° C., usually 25° C. Very suitable the epoxy resin is added to the curing agent, whereafter the phosphorus is added. The phosphorus may also be added to one or both of the constituents. Mixing may be carried out using conventional equipment. The invention further relates to the use of the compositions, especially in the impregnation of fibrous materials. It will be appreciated that the invention also relates to cured or partly cured products obtained by using the compositions of the present invention, especially prepregs and laminates.

The following examples illustrate the present invention. Unless otherwise mentioned, all parts and percentages are weight parts and weight percentages.

EXAMPLE 1

This example describes the preparation of a red phosphorus containing thermosettable resin composition and its use in the preparation of cured laminates. The resin component was prepared by charging to a reactor 59 g of liquid diglycidyl ether of bisphenol A (EPIKOTE 828, EEW 178–186, 2.0 epoxy groups per molecule from Shell Chemicals Europe), 2 g of solid tetraglycidyl ether of tetraphenylol ethane (EPIKOTE 1031, EEW 200–240), 6.1 g of suspended red phosphorus (MASTERET 70450, 50 percent phosphorus) and 34.9 g phenolnovolak resin (WPP 103–105, about 4-hydroxyl groups per molecule), heating the mixture to 140° C. and stirring for 5 minutes, whereafter 0.05 phr 2-methylimidazole was added. After 3 minutes glass web (200 g/m2) was impregnated with the resin composition. The impregnated glass webs were partially cured (160° C., 5 minutes, 40 percent solids). Laminates were prepared from four layers of prepregs (0.9 mm). Testing according to UL 94 showed that the laminates classified as V-0.

EXAMPLE 2

Example 1 was repeated, using 63 g of liquid diglycidyl ether of bisphenol A (EPIKOTE 828, EEW 178–186), 2.5 g of solid tetraglycidyl ether of tetraphenylol ethane (EPIKOTE 1031, EEW 200–240), 17.5 g of suspended red phosphorus (MASTERET 70450, 50 percent phosphorus), 17 g diphenylol propane (2-hydroxyl groups per molecule) and 25 g phenolnovolak resin (WPP 103–105, about 4-hydroxyl groups per molecule). Laminates made from four layers of prepreg classified as V-0 according to UL 94.

We claim:

1. A curable epoxy resin composition comprising a bisphenol epoxy resin having between 1.1 and 2.5 epoxy groups on average per molecule, a polyhydric novolac curing agent having more than two phenolic hydroxyl groups on average per molecule and red phosphorus in an amount of between 1.0 and 5.0 percent by weight based on the total reactive ingredients in the resin composition, said resin composition having a UL 94 rating of V-0 when cured.

2. The curable epoxy resin composition of claim 1 in which the epoxy resin has between 1.5 and 2.2 epoxy groups on average per molecule.

3. The curable epoxy resin composition of claim 2 in which the epoxy resin has between 1.8 and 2.1 epoxy groups on average per molecule.

4. The curable epoxy resin composition of claim 1 in which the epoxy resin is the reaction product of a bisphenol and an epihalohydrin.

5. The curable epoxy resin composition of claim 1 in which the epoxy resin has the general formula (I)

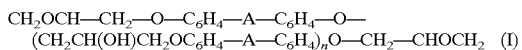

$$CH_2OCH-CH_2-O-C_6H_4-A-C_6H_4-O-$$
$$(CH_2CH(OH)CH_2OC_6H_4-A-C_6H_4)_nO-CH_2-CHOCH_2 \quad (I)$$

in which A is a divalent hydrocarbon group having 1 to 8 carbon atoms, —C(O)—, —O—, —S—, —S—S—, —S(O)—, —S(O)$_2$— or a covalent bond, and n has an average value of 0 to 12.

6. The curable epoxy resin composition of claim 5 in which A is methylene or isopropylene and n has an average value from 0 to 2.

7. The curable epoxy resin composition claim 6 in which A is isopropylene and n is up to 0.2.

8. The curable epoxy resin composition of claim 1 in which the polyhydric novolac curing agent has between 2.5 and 6 phenolic hydroxyl groups on average per molecule.

9. The curable epoxy resin composition of claim 8 in which the polyhydric novolac curing agent has between 3.5 and 5 phenolic hydroxyl groups on average per molecule.

10. The curable epoxy resin composition of claim 1 in which the polyhydric novolac curing agent is a condensation product of a phenol compound and an aldehyde.

11. The curable epoxy resin composition of claim 10 in which the phenol compound is selected from the group consisting of phenol, cresol, bisphenol A, bisphenol F, hydroquinone, resorcinol, methyl resorcinol, tetramethylbiphenol, biphenol, naphthol, and dihydroxynaphthalene.

12. The curable epoxy resin composition of claim 10 in which the aldehyde is formaldehyde, acetaldehyde, propionaldehyde, or hydroxybenzaldehyde.

13. The curable epoxy resin composition of claim 10 in which the phenol compound is phenol and the aldehyde is formaldehyde.

14. The curable epoxy resin composition of claim 1 in which the ratio between the equivalents of epoxy groups and hydroxyl groups is between 0.25 and 4.0.

15. The curable epoxy resin composition of claim 1 in which the composition further comprises one or more catalysts selected from the group consisting of 2-methyl imidazole and 2,4-ethyl methyl imidazole.

16. The curable epoxy resin composition of claim 1 in which the composition also comprises a solvent or diluent, a filler, pigments, dyes, flow modifiers, thickeners, reinforcing agents, fire retarding or surpressing agents or combinations thereof.

17. A process for the preparation of a curable epoxy resin composition comprising mixing a bisphenol epoxy resin having between 1.1 and 2.5 epoxy groups on average per molecule, a polyhydric novolac curing agent having more than two phenolic hydroxyl groups on average per molecule and red phosphorus in an amount of between 1.0 and 5.0 percent by weight based on the total reactive ingredients in the resin composition, said epoxy resin composition having a UL 94 rating of V-0 when cured.

18. A cured epoxy resin composition of claim 1.

19. The curable epoxy resin composition of claim 1 further comprising fibers.

20. A cured product of claim 19.

21. A fibrous material impregnated with a partly cured epoxy resin composition of claim 1.

22. A cured laminate obtained by curing impregnated fibers of claim 19.

* * * * *